Patented May 26, 1936

2,042,363

UNITED STATES PATENT OFFICE 2,042,363

HIGH TEMPERATURE REFRACTORY CEMENT

Gilbert E. Seil, Cynwyd, Pa.

No Drawing. Application October 12, 1935,
Serial No. 44,685

9 Claims. (Cl. 106—9)

This invention relates to high temperature cement. Such a material may be used, as a specific application, in the construction of industrial furnaces, such as metallurgical and glass furnaces and the like, wherein it may be used to fill and cement the spaces between adjacent surfaces of bricks and as a furnace lining over the exposed faces of the brick. One function of the cement, when used in this manner, is to fill the inequalities in the brick surfaces and it should have physical and chemical characteristics similar to those of the brick with which it is used. Users of such cements have been troubled, heretofore, with a high percentage of shrinkage and with softening and fusion of such cements when in use at high temperatures.

It is an object of this invention, therefore, to devise a cement which is free from such disadvantages, that is, a cement which will dependably withstand temperatures up to 3500° F., if not therebeyond, with practical freedom from softening and shrinkage.

Another object is to devise a cement which is a neutral entity wherein all the chemical requirements of its constituents are satisfied.

Other objects to be attained by the cement formed in accordance with this invention are (1) that its ultimate constituents comprise chromite and forsterite; (2) that all shrinkage of its major constituents has been eliminated before the cement is used; (3) that it contains a quantity of protective colloids; (4) that the cement mixture has therein binders or bonds operative effectively to strengthen the cement at all ranges of temperature to which the cement may be exposed during use; (5) that the cement comprises a recrystallized chrome ore, and a corrective for the binders or bonds in the mixture and the impurities in the chrome ore which will transform any low melting point compounds into useful high melting point compounds, and (6) that the cement after heating to service temperatures comprises a burnt stabilized cement.

With these and other objects in view, the invention consists in the composition and novel combination and arrangement of constituents hereinafter fully described, illustrated in the specific examples, and set forth in the claims hereto appended, it being understood that various changes in the form, proportion, and minor details of composition, within the scope of the claims, may be resorted to without departing from the spirit of the invention or sacrificing any of the advantages thereof.

This invention resides in forming a refractory cement wherein there is present as constituents thereof a mixture or combination of substances between which chemical reactions progressively take place as temperatures in successively higher ranges are encountered by the cement, by virtue of which the cement becomes essentially a non-shrinking and non-softening material capable of withstanding any temperature in connection with which the cement is devised to be used.

More particularly, the cement is formed of constituents, the basic one of which is a heat treated recrystallized chrome ore in which the gangue materials are distributed in thin glassy layers over the crystals of chromite. Another constituent is sodium silicate, which aids in giving the cement a so called "cold set" and acts as a bond to temperatures in the neighborhood of 1200° F. A third ingredient is magnesium oxide (periclase). The inventive mixture of these may and preferably does contain a protective colloidal organic material for keeping the cement material in suspension.

At the temperature of installation, the sodium silicate and the hydrated magnesium oxide (formed if water is the vehicle for thinning the cement for application) provide strength on drying. As increasing temperatures in a lower range (say up to 1200° F.) are encountered the sodium silicate provides the strength for the cement. As the temperature increases and the sodium silicate melts, the molten silicates react with the periclase, forming magnesium silicates which eventually become forsterite. The soda is volatilized at very high temperatures.

In a next hgher range of temperatures (say 2300° to 2600° F.) the magnesium silicate glass around the chromite crystals melts and reacts with the magnesium oxide, resulting finally in the formation of forsterite, which comprises a good heat resisting and non-shrinking bonding material for the recrystallized chromite at temperatures at least as high as 3500° F. The magnesium oxide available in the cement thus forms an infusible compound with all additions to the chrome ore and also with impurities in the chrome ore itself so there must be in the cement enough magnesium oxide present at all times to meet the requirements of these chemical reactions. Thus, the cement of this invention is provided with a strength-giving component effective at all temperatures for the withstanding of which the cement is devised, even though the particular component depended upon for this result may vary or change as different temperature ranges are encountered by the cement. The cement when finished has a softening point of about 3500° F. and the finished burnt stabilized cement comprises essentially chromite and forsterite.

A protective colloid material satisfactorily used if the cement is to be held in suspension in water is a water soluble starch of the type of amijel or amidex, and if the cement is to be suspended in oil, rosin may be used effectively. The protective colloid is used to prevent separation or stratification of the mix and to prevent absorption of the fluid of the mix by the porous refractory unit to which the cement mix is applied. As a part of this invention, it also has been discovered that the presence of this protective colloid in the cement mix causes the mix to have the property of adhering more strongly to a trowel or other instrument when the cement is being applied to its place of ultimate use, thereby rendering the mix easier to work and apply. The protective colloid present in the dry cement however, is disintegrated as the cement is exposed to heat so it is in effect absent in the finished burnt cement, and, as it forms such a small percentage of the total starting materials, its disintegration does not result in shrinkage.

So one important feature of advantage of the cement of this invention is that it has operative therein a bonding or strengthening substance which is substantially equally effective or efficient throughout all of the temperature ranges to which the cement is devised to be exposed. This effect is realized by adding to the mixture of cement ingredients a low melting point bond plus a corrective for this bond and also for the impurities in the original chrome ore. Another important feature is that the cement of this invention is not subject either to shrinkage or to fusion as a unit. There may be fusion of one or more components, but this is corrected by the corrective ingredient.

The treated chrome ore used as the base material for this cement mixture is attained by exposing chrome ore to temperatures of approximately 3100° F. or higher, whereupon the chromite of the ore recrystallizes without fusion of the gangue material of the ore and the gangue is found to have redistributed itself uniformly in adsorbed condition upon and around the chromite particles in a film of infinitesimal thickness. As treated chrome ore of this type has all shrinkage removed therefrom, it lends itself satisfactorily to the making therefrom of a high temperature cement.

For the purpose of illustrating a specific application of the principles of the present invention an example for making a batch of the cement of this invention is given as follows:

One takes 72 parts of chrome ore, treated as just described, which has been finely ground; 21 parts of periclase which also has been finely ground; 5 parts water soluble sodium silicate; and 2 parts water soluble starch such as amijel. The treated chrome ore and the periclase are each ground to a fineness whereby substantially all will pass a 40 mesh Bureau of Standards screen, and at least 70% will pass a 200 mesh screen. These materials are mixed until they form a uniform mix, whereupon this dry cement is ready to be packed for shipment to customers. In general, a fair average sample of this dry cement should show, in a wet screen test, on a dry basis, not more than 2.5% caught on a 40 mesh screen and not less than 70% passing through a 200 mesh screen.

If the cement is to be suspended in oil instead of water by the user, then, instead of amijel or other water soluble starch, there should be substituted in the mix about .1% rosin. In this connection, this invention included the discovery that a very slight amount of rosin, added to a cement made from heat treated or calcined materials, when such a cement is suspended in a non-aqueous liquid, has the property of making the cement adhere to a trowel or other tool used in working the cement, which is a highly desirable characteristic.

I claim:

1. A dry cement material for refractory uses comprising essentially heat treated recrystallized chromite, sodium silicate and periclase.

2. A dry cement material for refractory uses comprising essentially heat treated recrystallized chromite, sodium silicate, periclase and a colloid material.

3. A dry cement material for refractory uses comprising essentially heat treated recrystallized chromite, sodium silicate, periclase and a water soluble starch material.

4. A dry cement material for refractory uses comprising essentially heat treated recrystallized chromite, sodium silicate, periclase and rosin.

5. A dry cement material for refractory uses comprising essentially heat treated recrystallized chrome ore, sodium silicate, and periclase.

6. The process of making a refractory cement which consists in dispersing in a liquid vehicle cement constituents comprising essentially recrystallized chrome ore, periclase and a silicate such as sodium silicate for effecting a cement mix of a suspension of said constituents in said liquid vehicle; applying said mix to the place of use of the cement; and exposing said so-placed mix to heat at temperatures sufficiently high to cause chemical reaction between the silicate and the magnesium of the periclase to form magnesium silicate.

7. The process according to claim 6 with the additional step of exposing said mix to heat at still higher temperatures to cause chemical reaction to change the magnesium silicate into forsterite.

8. The process of making a refractory cement which consists in dispersing in a liquid vehicle cement constituents comprising recrystallized chrome ore, periclase, sodium silicate and colloidal material for effecting a cement mix of a substantially permanent suspension of said constituents in said vehicle; applying said mix to the place of use of the cement; and exposing said so-placed mix to heat at temperatures sufficiently high to disintegrate said colloidal material and to form magnesium silicate in the cement.

9. The process according to claim 8 with the additional step of exposing said mix to heat at still higher temperatures to cause chemical reaction to change the magnesium silicate into forsterite.

GILBERT E. SEIL.